Jan. 30, 1968 C. G. ESLER 3,366,845
MULTIMETERING SERVICE-ENTRANCE PANELBOARD
Filed July 11, 1966 3 Sheets-Sheet 2
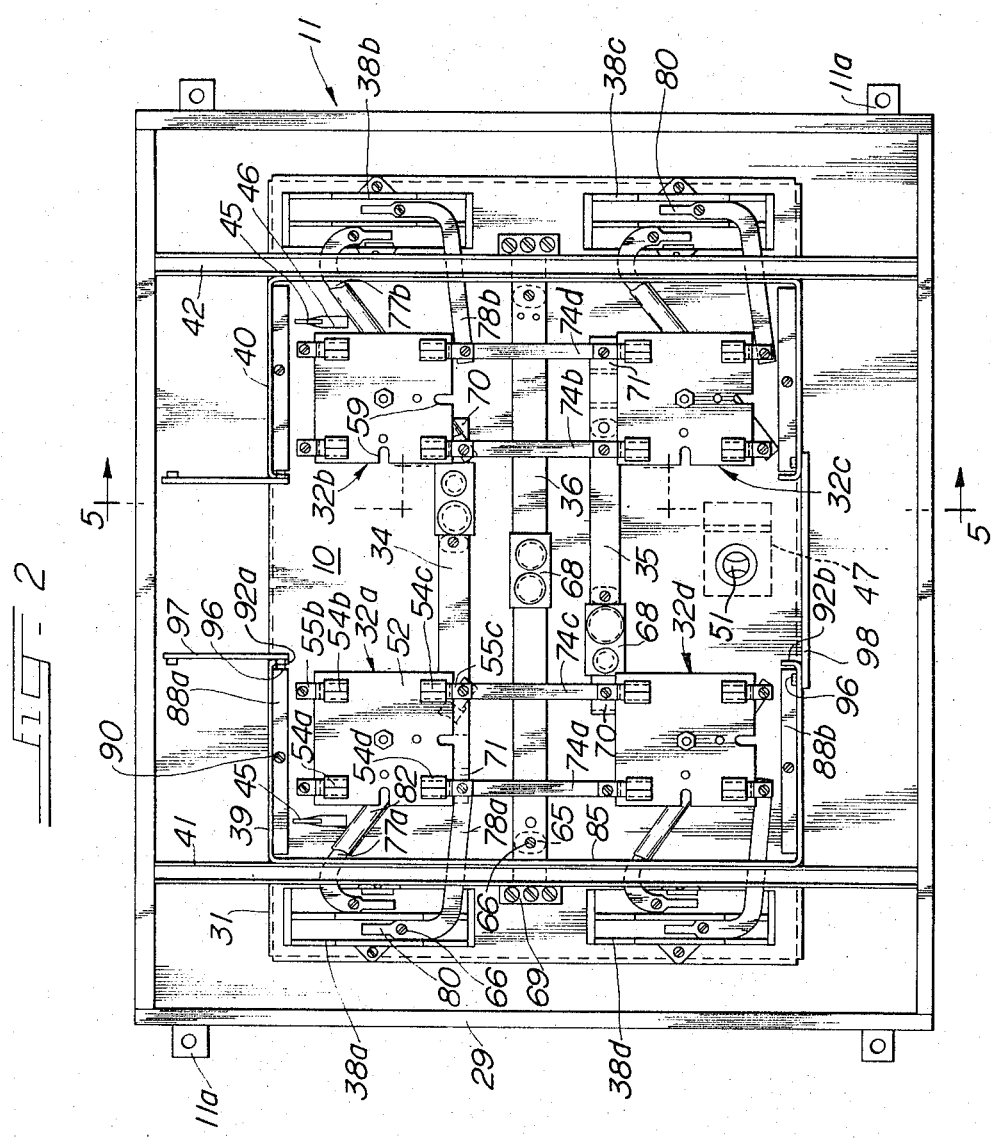
INVENTOR.
CHARLES G. ESLER

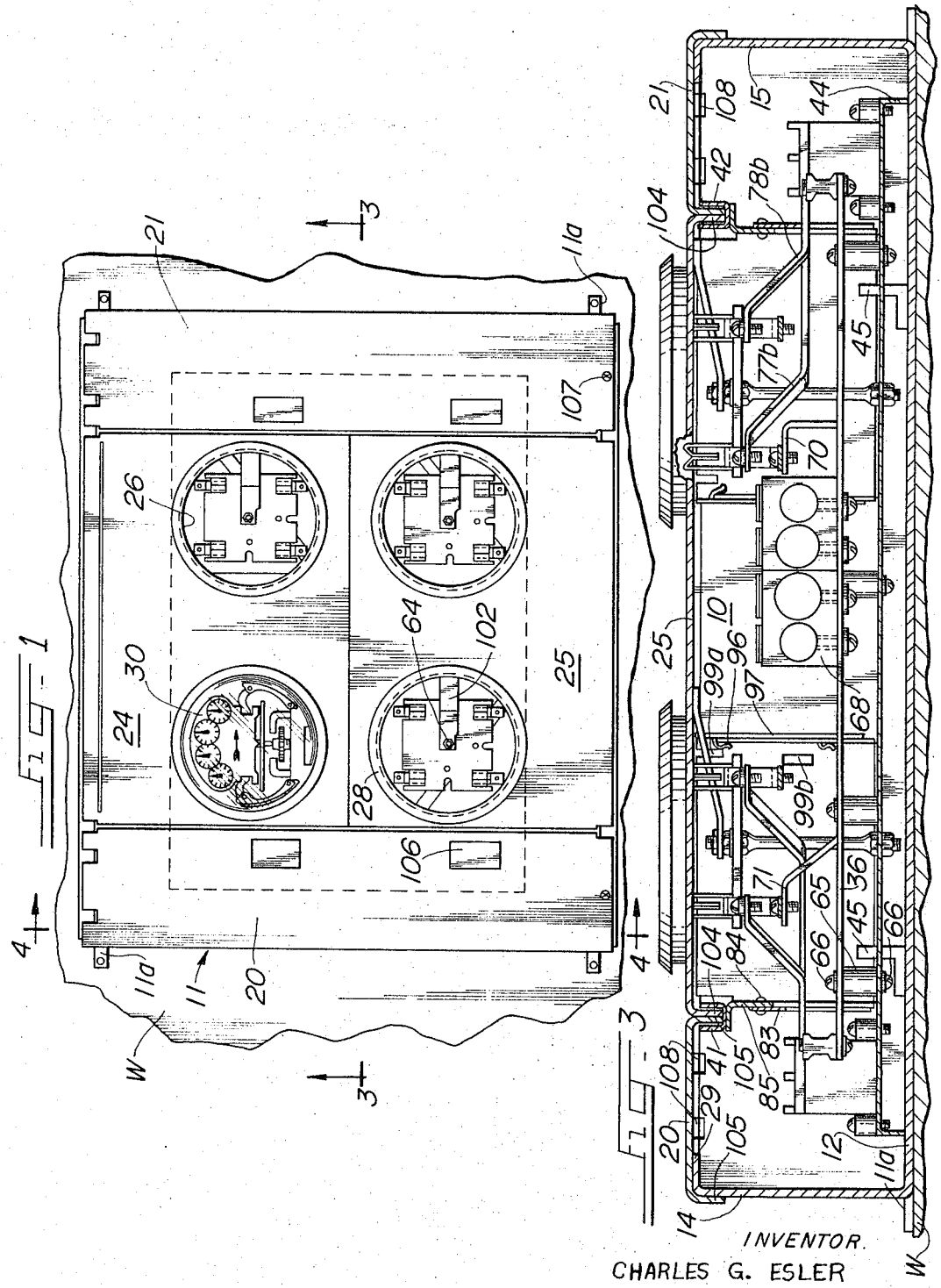

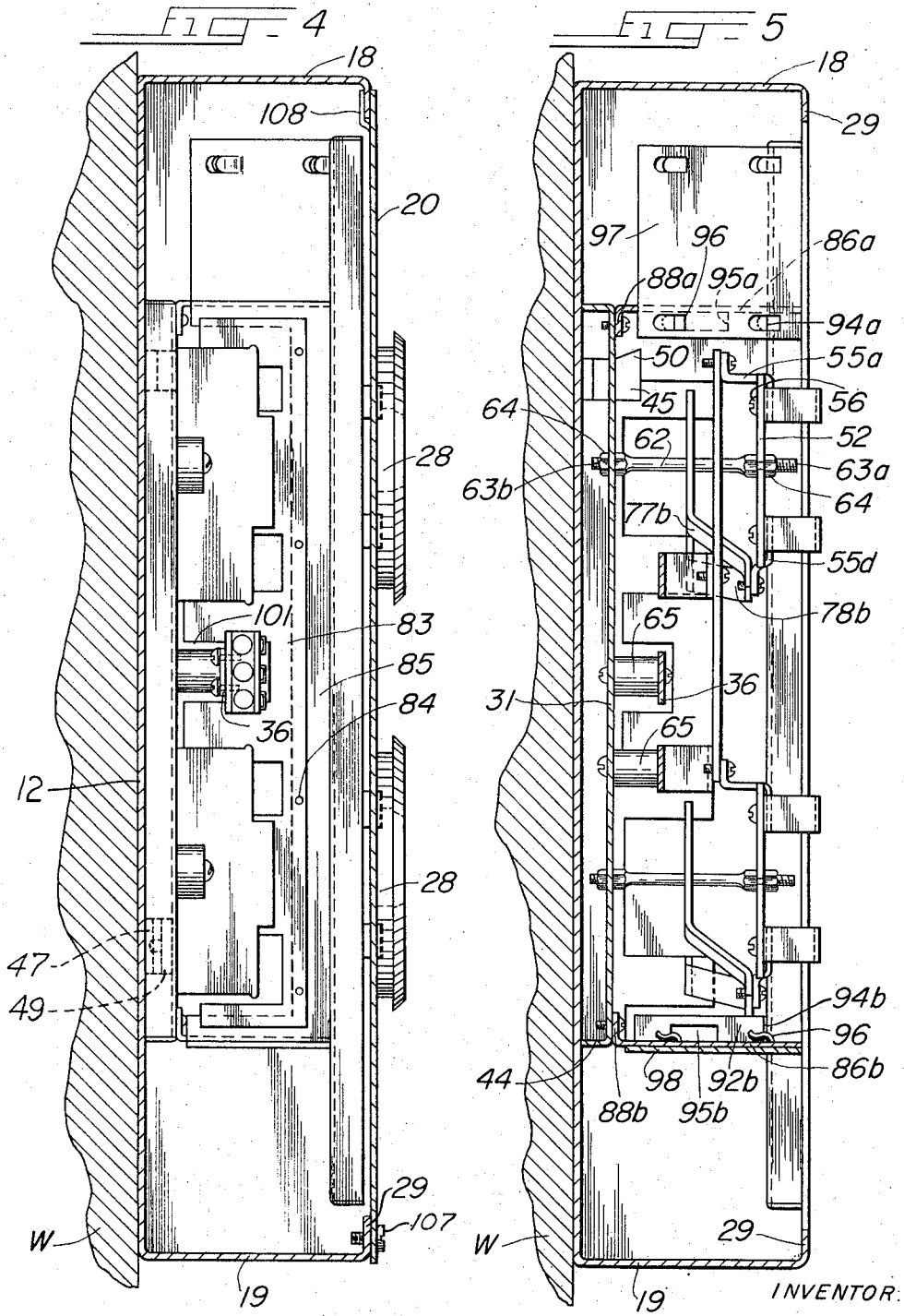

United States Patent Office 3,366,845
Patented Jan. 30, 1968

3,366,845
MULTIMETERING SERVICE-ENTRANCE
PANELBOARD
Charles G. Esler, Arcadia, Calif., assignor to Square D
Company, Park Ridge, Ill., a corporation of Michigan
Filed July 11, 1966, Ser. No. 564,072
10 Claims. (Cl. 317—106)

ABSTRACT OF THE DISCLOSURE

A panel assembly, comprising a panel on which are mounted watt-hour meter sockets, circuit breakers and electrical conductors, is arranged so as to be inserted as a unit into a metal enclosure. The panel assembly is suspended at the top from a hanger attached to the rear wall of the metal enclosure, insertion and removal being facilitated by vertical forwardly-positioned U-shaped channels opening toward the front of the enclosure and receiving a number of sectionally removable cover plates.

---

This invention relates to electrical multimetering service-entrance panelboards or switchboards, and more particularly to such a panelboard in which circuit breaker and watt-hour meter sockets and associated bussing are pre-assembled at a factory in a sub-assembly for later field installation in the box of the panelboard.

In the metering of electrical power used in multiple tenant buildings, it is common to use a service-entrance panelboard which includes a plurality of watt-hour meters and circuit breakers. During initial construction of a building, it is desirable to place the box of the panelboard in or on the wall of the building, but is undesirable to include the bussing and the meter and circuit breaker sockets of the panelboard at that time because of the susceptibility of damage during further construction. Heretofore, this has not been feasible because of the difficulty in assembling the bus bars and meter and circuit breaker sockets in the box of the panelboard when electrical power is to be supplied to the various portions of the building. In accordance with this invention, a sub-assembly including the complete bussing for a group of watt-hour meters and circuit breakers together with the mounting sockets for the meters and circuit breakers is provided and has mounting means so arranged that the sub-assembly can be secured within a pre-installed box with the use of a single screw.

It is an object of this invention to provide an improved multimetering panelboard.

A further object is to provide a sub-assembly comprising bussing, circuit breaker sockets and watt-hour sockets which can be mounted as a unit in the box of a panelboard.

Further objects and advantages of this invention will become apparent from the following specification wherein reference is made to the drawings, in which:

FIG. 1 is a front view of a multimetering panelboard in accordance with this invention with one watt-hour meter in place;

FIG. 2 is a view similar to FIG. 1 with a plurality of front cover plates of the panelboard removed;

FIGS. 3 and 4 are sectional views taken generally along the lines 3—3, 4—4 of FIG. 1; and FIG. 5 is a sectional view taken generally along the line 5—5 of FIG. 2.

Referring to the drawings, a multimetering panelboard or switchboard in accordance with this invention comprises a multimetering panel assembly 10 removably mounted within a metal enclosure 11. The enclosure 11 is mounted on a wall W by a plurality of brackets 11a and has a rear wall 12, a pair of side walls 14 and 15, top and bottom walls 18 and 19, a pair of removable side front cover plates 20 and 21, and a pair of removable center front cover plates 24 and 25 each having a pair of horizontally-spaced circular meter-receiving openings 26 provided with respective metal collars 28. Along the front edges of the walls 14, 15, 18, and 19 is a continuous, inwardly-turned mounting flange 29 parallel with the rear wall 12. In FIG. 1, a watt-hour meter 30 is shown positioned in one of the openings 26.

The multimetering panel assembly 10 comprises a rectangular metal panel 31 on which are mounted a plurality of meter sockets 32a, 32b, 32c, and 32d, an upper line bus bar 34, a lower line bus bar 35, a neutral bus bar 36, a plurality of circuit breaker sockets 38a, 38b, 38c, and 38d, and a pair of generally U-shaped barrier walls 39 and 40 having their bight portions secured as by spot-welding to a pair of channels 41 and 42, respectively. The panel 31 has a peripheral rearwardly-turned flange 44.

For securing the panel assembly 10 in the enclosure 11, a pair of L-shaped supporting brackets 45 (FIGS. 2, 3, 4, and 5) are attached to the upper portion of the rear wall 12 of the enclosure 11, preferably by spot-welding, and are received respectively in a pair of elongated openings 46 (FIG. 2) formed in the panel 31, and by a Z-shaped bracket 47 (FIG. 4), also preferably spot-welded to the rear wall 12. The bracket 47 has a portion 49 in spaced parallel relation with the rear wall 12 and provided with a threaded opening, not shown, accommodating a captive screw 51 extending through an opening in the panel 31. Each of the brackets 45 has two mutually perpendicular planar sections with one planar section in contact with the rear wall 12 and the other planar section extending outwardly, and as seen in FIG. 5, having a tapered projection 50 extending upwardly from its upper front corner to provide for locking the panel assembly 10 securely in place. Each of the openings 46 converges toward its top to permit convenient insertion of the projection 50 of the corresponding bracket 45 into the lower portion of the opening 46 before aligning the bracket 45 with the upper portion.

As shown best in FIGS. 2 and 5, each of the meter sockets 32a, b, c, and d comprises a generally flat rectangular plate 52, preferably formed of polyester glass fiber, on which are mounted, in a rectangular array, a plurality of conventional meter jaws 54a, 54b, 54c, and 54d arranged for receiving a plug-in watt-hour meter such as the meter shown in FIG. 1. The pair of the jaws 54a and 54b mounted on the upper portion of each plate 52 are for electrical connection to power lines and are connected to a pair of Z-shaped line lugs 55a and 55b, respectively, as shown best in FIG. 5. The pair of jaws 54c and 54d mounted on the lower portion of each plate 52 are for electrical connection to a load circuit and have connected therewith a pair of Z-shaped load lugs 55c and 55d, respectively. The jaws 54a, b, c, and d of each meter socket 32a, b, c, and d are secured to the plate 52 and connected with their respective line and load lugs 55a, 55b, 55c, and 55d by respective bolts 56 directed outwardly through the plates 52 as shown in FIG. 5 and threaded into the corresponding lugs 55a, b, c, and d.

The line lugs 55a and 55b and the load lugs 55c and 55d are formed with respective connecting portions parallel with and below the plate 52 with the connecting portions of the line lugs 55a and 55b disposed a greater distance inwardly of the plate 52 than the connecting portions of the load lugs 55c and 55d. As shown best in FIG. 5, the plates 52 have notched portions accommodating the turned-in portions of the lugs 55a, b, c, and d and preventing rotation of the lugs about their respective mounting bolts 56. Also, each of the plates 52 has a pair of similar but smaller notches 59 (FIG. 2) and a pair of additional openings for the mounting of additional jaws (not shown) as might be required for a watt-hour meter different than the meter 30.

Referring now to FIG. 5, each meter socket 32a, b, c, and d is mounted on the panel 31 by a metal post 62 having a relatively long threaded outer end portion 63a and a relatively short threaded inner end portion 63b with the outer end portion 63a extending through a central opening in its associated plate 52 and fastened by a nut 64, and with the inner end portion 63b received in an opening in the panel 31 and also secured by a nut 64.

The four meter sockets 32a, b, c, and d are mounted in a rectangular array with their respective plates 52 arranged with their side edges parallel to corresponding side edges of the panel 31.

Referring to FIGS. 2, 3, 4, and 5, the neutral bus bar 36 is a straight flat strip of metal mounted horizontally in the center of the panel 31 upon a pair of short insulating posts 65 fastened thereto and to the panel 31 by means of respective bolts 66. Bolted to the approximate center of the neutral bus bar 36 is a connector 68 preferably of the set-screw type, as shown, for receiving wires of two different sizes. Bolted onto each end portion of the neutral bus bar 36 is a set-screw type connecting terminal 69 having spaces for three wires.

Referring to FIG. 2, the upper line bus bar 34 and the lower line bus bar 35 are secured to the panel 31 respectively above and below the neutral bus bar 36 and parallel thereto by respective pairs of short insulating posts 65. Bolted to the line bus bars 34 and 35 are respective connectors 68, preferably of the set-screw type, for receiving two different sizes of wire.

Referring to FIGS. 2 and 3, each of the line bus bars 34 and 35 has one of its end portions extending outwardly from the panel 31 and laterally toward the center thereof by means of two right-angle bends thereby defining a connecting portion 70, and has its other end portion extending outwardly from the panel 31 and laterally away from the center thereof by two mutually complementary bends thereby defining a connecting portion 71 parallel to the panel 31. The connecting portions 70 and 71 each have openings (not shown) and are spaced from the panel 31 a slightly less distance than the distance between the connecting portion of the line lugs 55a and 55b and the panel 31. The end portions of the upper line bus bar 34 are offset to the left as viewed in FIGS. 2 and 3 so that its connecting portions 70 and 71 are in alignment with the respective line lugs 55a of the meter sockets 32b and 32a, respectively. The end portions of the lower line bus bar 35 are offset to the right (FIG. 2) so that its connecting portions 70 and 71 are directly behind the line lugs 55b of the meter sockets 32d and 32c, respectively, for connection therewith as next described.

A straight interconnecting bus bar 74a has its opposite end portions electrically connected to respective lugs 55a of the vertically adjacent meter sockets 32a and 32d, and a similar interconnecting bus bar 74b has its opposite end portions electrically connected to respective lugs 55a of the vertically adjacent meter sockets 32b and 32c.

Another pair of straight interconnecting bus bars 74c and 74d similarly connect the line lugs 55b of vertically adjacent pairs of meter sockets 32a and 32d, and 32b and 32c, respectively.

The lugs 55b of the meter sockets 32c and 32d are connected to end portions 71 and 70, respectively, of the bus bar 35. The bus bars 74a and 74b are connected approximately midway between their ends to the end portions 71 and 70 respectively of the upper line bus bar 34.

Referring to FIGS. 2 and 5, the circuit breaker sockets 38a, 38b, 38c, and 38d are fastened to the panel 31 preferably by a pair of self-tapping screws in a rectangular array each near its associated meter sockets 32a, 32b, 32c, and 32d. A relatively long curved bus bar 77a is connected at one end to the lug 55c of the meter socket 32a and has its other end positioned in the circuit breaker socket 38a and shaped to form a contact finger terminal 80 for engagement with the jaws of a plug-in circuit breaker (not shown). A relatively short bus bar 78a is connected at one end to the lug 55d of the meter socket 32a and has its other end positioned in the circuit breaker socket 38a and similarly shaped to form a contact finger terminal 80 for the circuit breaker. Similarly, curved bus bars 77b and 78b, 77a and 78a, and 77b and 78b are electrically connected at one end to respective lugs of the meter sockets 32b, 32d, and 32c and have their other ends positioned in respective circuit breaker sockets 38b, 38d, 38c, and shaped to form contact finger terminals 80 for respective circuit breakers. The load lugs 55c and 55d are connected with the associated curved bus bars 77a and 77b and 78a and 78b, preferably with self-tapping screws. As shown in FIGS. 3 and 5, the curved bus bars 77a and 77b and 78a and 78b each have a pair of mutually complementary angle bends to effect a traverse from the distance to the panel 31 of the connecting portions of the load lugs 55c and 55d to the distance to the panel of the circuit breaker sockets 38a, 38b, 38c, and 38d connecting points. The curved bus bars 77a and 77b and 78a and 78b have, near their respective contact fingers 80, respective openings (not shown) for accommodating the bolt 66 for attachment to the appropriate one of the circuit breaker sockets 38a, 38b, 38c, and 38d. An insulating sleeve 82 is disposed around each of the long curved bus bars 77a and 77b.

Referring to FIGS. 2, 3, 4, and 5, the barrier walls 39 and 40 are mirror image equivalents and therefore only the wall 39 will be discussed in detail. The wall 39 has a bus bar barrier plate 83 (FIG. 4) of insulating material attached by rivets 84 to a large U-shaped portion formed of a single sheet of metal having a vertical central portion 85 and horizontal top and bottom portions 86a and 86b, respectively. The top and bottom portions 86a and 86b have perpendicular thereto, at their rear, inwardly-turned mounting flanges 88a and 88b, respectively, each having an opening for mounting to the panel 31 preferably by means of self-tapping screws 90. Additionally the top and bottom portions 86a and 86b have barrier mounting flanges 92a and 92b perpendicular thereto, turned inwardly toward the center of the enclosure 11 and not extending as far to the front as the top and bottom portions 86a and 86b thereby defining recessed front edges 94a and 94b, respectively (FIG. 5). The barrier mounting flanges 92a and 92b have respective slots 95a and 95b which, together with the front edges 94a and 94b are for receiving respective mounting clips 96 of a removable, vertical clip-on barrier 97 shown in FIGS. 2, 3, and 5 as mounted on the mounting flange 92a. For mounting a horizontal clip-on barrier 98 of another size, as shown in FIG. 2, the top and bottom portions 86a and 86b each have, near their respective flanges 92a and 92b, a pair of slots 99a and 99b for receiving the mounting clips 96 of a removable clip-on barrier 98 shown as mounted on the mounting flange 92b.

As shown in FIG. 4, the insulated bus bar barrier plate 83 has a centered rectangular opening 101 to accommodate the neutral bus bar 36 and a plurality of additional similar openings to accommodaate the pairs of the curved bus bars 77a and 78a.

As shown in FIGS. 1 and 3, the center front plates 24 and 25 have welded thereto a pair of brackets 102 with openings for attachment to the long threaded portions 63a of the metal posts 62, described above, by means of additional nuts 64. The center front plates 24 and 25 each have on both their vertical sides rearwardly turned flanges 104 received in the respective channels 41 and 42 as shown in FIG. 3.

The side front plates 20 and 21 each have a pair of vertical rearwardly turned flanges 105 at the side closest the center, a pair of openings 106 for access to circuit breakers (not shown) when installed in the circuit breaker sockets 38a, 38b, 38c, and 38d, a captive quarter turn fastener 107 and a pair of tangs 108. The side front plates 20 and 21 are mounted with the flange 29 at the top wall 18 secured between the plates and their respective tangs 108 as shown in FIG. 4, and with the fastener 107 received in an opening in the flange 29 of the bottom wall 19.

I claim:

1. A unitary multimetering panel and enclosure combination comprising an enclosure having a rear and four side walls, a rigid panel, a plurality of meter sockets fixedly secured in spaced-apart relation on said panel, a plurality of bus bars carried by said panel and connected to said meter sockets, line terminals on said bus bars, means removably securing said panel to said rear wall, a pair of spaced-apart U-shaped channels carried by said panel in spaced relation thereto forwardly of said meter sockets, the channels opening toward the front of the enclosure when the panel is mounted on the rear wall, and a plurality of removable front plates for the enclosure having inturned flanges which are received in said channels.

2. The combination of claim 1 characterized in that one of said front plates has inturned flanges on opposite sides which are received in said channels, respectively.

3. The combination of claim 2 characterized in that an inturned flange of a second of said plates is received in one of said channels and an inturned flange of a third of said plates is received in the other of said channels.

4. The combination of claim 3 characterized in that the channels are of a length slightly less than the distance between a pair of opposite ones of said side walls.

5. The combination of claim 1 characterized in that the removable securing means comprises a pair of support brackets and a securing bracket, said support brackets are secured in spaced-apart relationship on the upper portion of said rear wall and extend inwardly of the enclosure therefrom, said securing bracket is secured to the lower portion of said rear wall and has a portion parallel with and spaced inwardly of the enclosure from said rear wall and provided with a threaded opening, the upper portion of said panel is provided with a pair of openings receiving said support brackets, respectively, and a captive screw carried by said panel is received in said threaded opening.

6. The combination of claim 1 characterized in that said meter sockets are disposed in the central area of the panel, a pair of generally U-shaped barrier walls extend outwardly from the panel with their respective bight portions on opposite sides of said central area, respectively, the leg portions of each barrier wall extending toward the corresponding leg portions of the other above and below the central area, mounting flanges are provided at the free ends of the leg portions of said U-shaped barrier walls, respectively, and a plurality of clip-on barriers are removably mounted on said mounting flanges.

7. The combination of claim 6 characterized in that at least one socket for receiving a circuit breaker is carried by said panel between the bight portion of at least one of said barrier walls and the adjacent edge of the panel, and some of said bus bars extend into said socket.

8. The combination of claim 6 characterized in that at least one of said clip-on barriers is removably secured at opposite ends respectively to a pair of said mounting flanges so as to be in alignment with the associated leg portions of the barrier walls.

9. The combination of claim 6 characterized in that at least one of said clip-on barriers is removably secured solely to one of said mounting flanges and extends normal to the associated leg portion toward the adjacent edge of the panel.

10. The combination of claim 6 characterized in that the barrier walls carry respective U-shaped channels along their side edges remote from the panel, the channels open toward the front of the enclosure when the panel is mounted on the rear wall, and a plurality of removable front plates for the enclosure have inturned flanges received in said channels.

References Cited

UNITED STATES PATENTS

| | | | |
|---|---|---|---|
| 1,855,614 | 4/1932 | Sparkes | 317—106 |
| 2,403,132 | 8/1946 | Sparkes et al. | 317—107 |
| 2,642,483 | 6/1953 | Wey | 317—105 |
| 3,131,984 | 5/1964 | Kobryner | 317—111 X |

ROBERT K. SCHAEFER, *Primary Examiner.*

M. GINSBURG, *Assistant Examiner.*